United States Patent Office 3,530,747
Patented Sept. 29, 1970

3,530,747
CENTERED CLAMPING DEVICE
Horst Lorenz, Solingen, Germany, assignor to Th. Kieserling & Albrecht, Solingen, Germany
Continuation-in-part of application Ser. No. 495,907, Oct. 14, 1965. This application July 11, 1967, Ser. No. 652,590
Int. Cl. B23b 25/00
U.S. Cl. 82—38  4 Claims

ABSTRACT OF THE DISCLOSURE

Three clamping jaws are angularly spaced 120°. Only one clamping jaw is directly driven by a hydraulic fluid, but all three clamping jaws carry racks meshing with pinions which mesh with an annular gear so that all three clamping jaws are connected for simultaneous synchronized movement toward a line of symmetry in which a workpiece clamped by the clamping jaws is held.

CROSS REFERENCE TO A RELATED APPLICATION

The present application is a continuation-in-part application of my copending application Ser. No. 495,907, entitled "Apparatus for Machining the Ends of Workpieces" and now Pat. No. 3,342,108.

BACKGROUND OF THE INVENTION

In the apparatus disclosed in my copending application, Ser. No. 495,907, a clamping device is used for holding workpieces. This clamping device has an upper and a lower clamping jaw, and it has been found that the lower clamping jaw accumulates chips and cuttings furthermore centered clamping devices are known in which three clamping jaws are simultaneously operated.

SUMMARY OF THE INVENTION

It is one object of the invention to provide an improved centered clamping device in which a plurality of clamping means move simultaneously and synchronously toward and away from an axis of symmetry for holding or releasing a workpiece.

Another object of the invention is to drive only one of the clamping means, and to connect all clamping means by motion transmitting means for obtaining the simultaneous operation of all three clamping means.

With these objects in view, the present invention is concerned with a centered clamping device which is advantageously used for clamping a workpiece while the same is being machined.

One embodiment of the invention comprises three clamping means, including clamping jaws, located angularly spaced 120° about an axis of symmetry, and mounted on supporting means for movement toward and away from an axis of symmetry; a motor, preferably a hydraulic motor for operating one of the clamping means; and motion transmitting means connecting the clamping means for simultaneous symmetrical movement toward and away from the axis of symmetry. Consequently a workpiece located in the axis of symmetry is simultaneously clamped or released by all three clamping means when the motor is operated.

In the preferred embodiment of the invention, three housing portions are provided for guiding the three clamping means. One of the housing portions slidably guides the cylinder of the hydraulic motor, while the piston of the same is fixed. The cylinder is one clamping means, and three rack bars are respectively secured to the cylinder and to the other two clamping means. Three pinions mesh with the three racks and are connected by shafts to other three pinions which mesh with an annular gear concentric with the axis of symmetry.

Due to the positive meshing connections between the racks, pinions and the annular gear, synchronization of the inward and outward movement of the clamping jaws is obtained, although only one clamping means is driven by the hydraulic motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
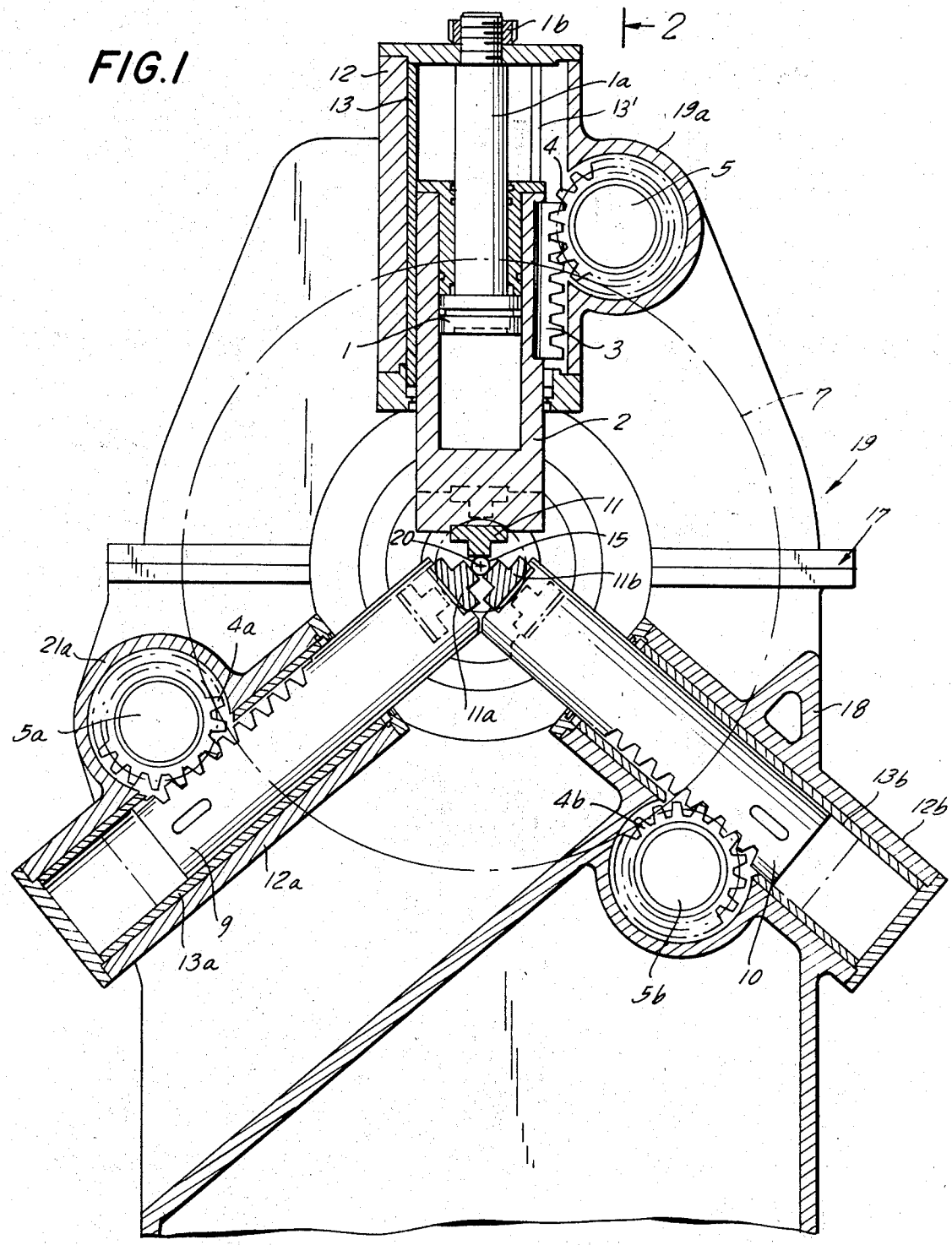
FIG. 1 is a cross-sectional view illustrating one embodiment of the invention.

A housing 17 consists of a lower part 18 and an upper detachable part 19. Housing 17 has three housing portions 12, 12a, and 12b which are angularly spaced 120° about an axis of symmetry 20. Sleeves 13, 13a and 13b are respectively mounted within the housing portions.

A hydraulic motor including a cylinder 2 and a piston 1 is mounted in housing portion 12. The piston rod 1a of piston 1 is secured by a nut 1b to the end plate of housing portion 12, while cylinder 2 is mounted in sleeve 13 for radial sliding movement. A rack 3 is secured to the outer periphery of cylinder 2 and projects out of a slot 13' of sleeve 13.

The upper housing part 19 has an axially extending carrier arm 21a in which bearings 5a and 5b are provided for rotatably supporting a shaft 5 at whose ends pinions 4 and 6 are located. Pinion 4 meshes with rack 3 of hydraulic cylinder 2 so that when the hydraulic motor is operated by admission of pressure oil into the working chamber formed between pinion 1 and cylinder 2, rack 3 turns pinion 4 together with shaft 5 and pinion 6. A clamping jaw 11 is secured to the inner end of hydraulic cylinder 2.

A rack member 9 is mounted for sliding movement within sleeve 13a of housing portion 12a, and meshes with the pinion 4a on a shaft 5a located in a carrier arm 21a forming part of the lower housing 18. Pinion 4a meshes with rack 9 so that a pinion, not shown, at the other end of shaft 5a, and corresponding to pinion 6, rotates when rack 9 moves.

Housing portion 12b is constructed in the same manner as housing portion 12a, and has a rack member 10 guided in sleeve 13b and meshing with a pinion 4b on a shaft 5b whose other end carries a pinion, not shown, corresponding to pinion 6. Clamping jaws 11a and 11b are respectively secured to rack members 9 and 10.

Figure 2:
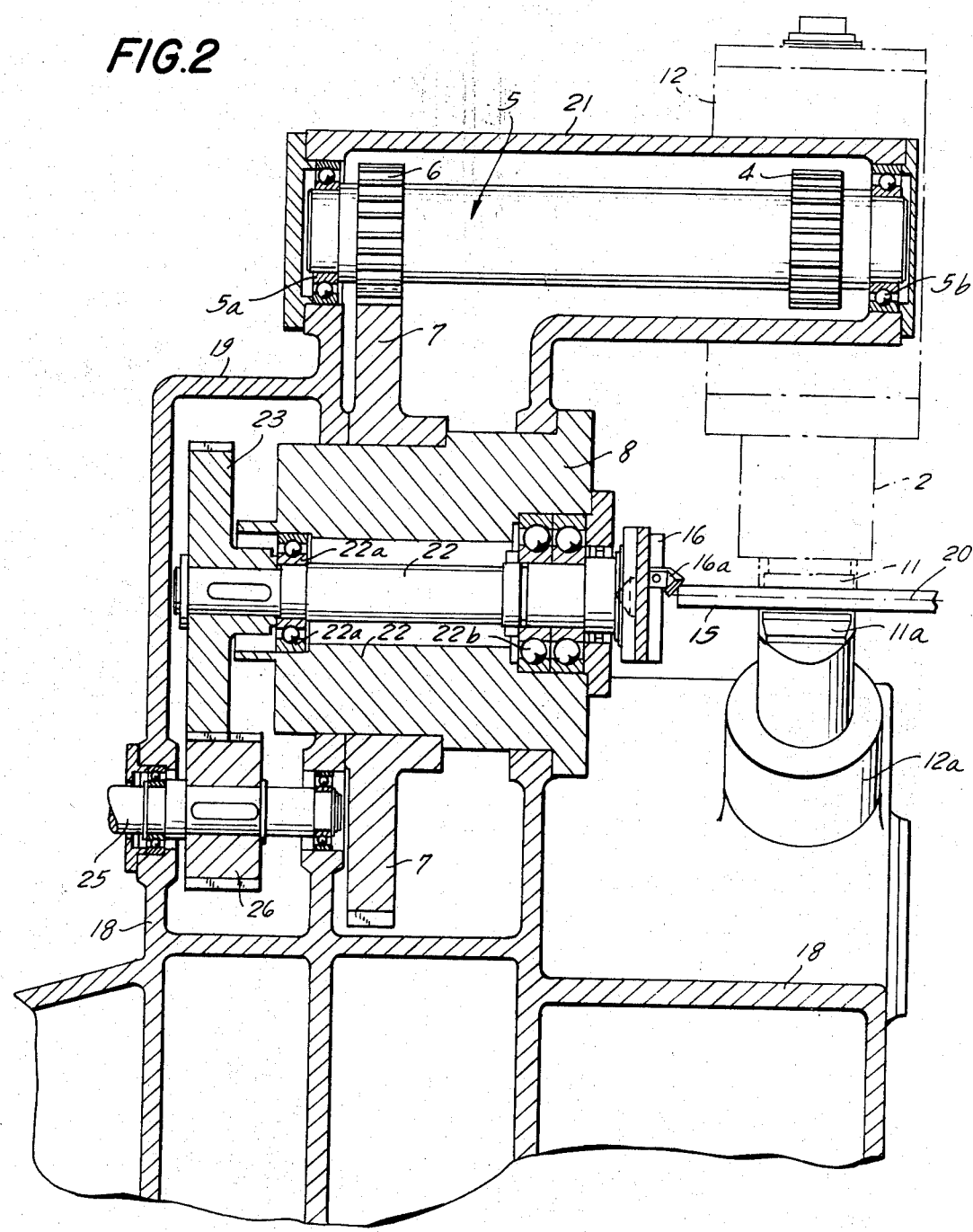
FIG. 2 is an axial sectional view of the embodiment of FIG. 1.

Housing 17 has a substantially tubular housing portion 8 on which an annular gear 7 is mounted for rotation, as best seen in FIG. 2 where the annular gear 7 is indicated by a dash-and-dot circle in FIG. 1. Annular gear 7 meshes with the three pinions 6 at the ends of shafts 5, 5a and 5b and connects the shafts, and thereby pinions 4, 4a and 4b for synchronous rotation.

A shaft 22 is mounted in bearings 22a and 22b within the tubular housing portion 8, and supports at its free end a tool holder 16 for a tool 16a which is located in the region of a workpiece 15 clamped by clamping jaws 11, 11a, and 11b. Shaft 22 has an axis of rotation coinciding with the axis of symmetry 20, and carries at the other end a gear 23 meshing with a gear 24 on a drive shaft 25, which is connected to a motor, not shown, for rotating the tool holder with tool 16a.

During operation, the clamping jaws are first in the spaced position indicated in chain lines in FIG. 1 and spaced from the axis of symmetry 20 so that a workpiece, for example a pipe or rod 15, can be inserted in axial direction between the spaced clamping jaws 11, 11a and 11b into the region of the tool 16a.

Thereupon an operating fluid such as oil, is admitted through inlet means, not shown, into the hydraulic cylinder 2 so that the same moves toward the axis of symmetry 20 and away from the fixed piston 1, while rack 3 meshes with pinion 4 and turns the same together with shaft 5 and pinion 6. Annular gear 7 is rotated by pinion 6 and rotates the corresponding pinions on shaft 5a and 5b, which are located in the same plane as pinion 6 and gear 7. Since the rotation of all pinions is synchronous, rack members 9 and 10 move at the same speed toward the line of symmetry 20 as cylinder 2, and the workpiece 15 is simultaneously engaged by all three jaws 11, 11a and 11b, and machined by tool 16a while being exactly centered in the axis of symmetry 20.

When the operating liquid is exhausted from hydraulic cylinder 2, the same moves in outward direction away from the workpiece, while motion transmitting means including the racks, pinions, shafts, and the annular gear 7, effect synchronous movement of clamping jaws 11a and 11b, together with clamping jaw 11 away from the workpiece which is released.

It will be understood that each of the elements described above, or two or more together, may also find a useful application in other types of centered clamping devices, differing from the types described above.

While the invention has been illustrated and described as embodied in a clamping device having three clamping jaws connected for synchronous movement and a hydraulic motor for operating one of the clamping jaws, it is not intended to be limited to the details shown, since various modifications and structural changes may be made without departing in any way from the spirit of the present invention.

What is claimed as new and desired to be protected by Letters Patent is set forth in the appended claims.

1. Centered clamping device comprising, in combination, supporting means including a plurality of housing portions angularly spaced about an axis of symmetry; motor means including a stationary member secured to said suporting means and a first movable clamping means mounted in one of said housing portions for movement toward and away from said axis of symmetry; other clamping means mounted in another housing portion for movement toward and away from said axis of symmetry; and motion transmitting means connecting said first and said other clamping means for simultaneous symmetrical movement toward and away from said axis of symmetry whereby a workpiece located in said axis of symmetry is simultaneously clamped and released by said first and other clamping means, said motion transmitting means including racks respectively connected with said first and said other clamping means for movement therewith, pinion means meshing with each of said racks, and an annular gear mounted on said supporting means for rotation about said axis of symmetry and meshing with said pinion means.

2. Centered clamping device as claimed in claim 1 wherein each of said pinion means includes a shaft mounted on said supporting means for rotation about an axis parallel with said axis of symmetry, and first and second pinions on the ends of each of said shafts, said first pinions meshing with said racks and said second pinions meshing with said anular gear.

3. Centered clamping device as claimed in claim 2 wherein said supporting means comprise a tubular portion having an axis coinciding with said axis of symmetry; wherein said annular gear is mounted on said tubular portion for rotation; and wherein said first pinions and said first and other clamping means are located in a first plane, and said second pinions and said annular gear are located in a second plane, said first and second planes beig parallel and transverse to said axis of symmetry.

4. Centered clamping device comprising, in combination, supporting means including first, second, and third housing portions angularly spaced an angle of 120° about an axis of symmetry; hydraulic motor means including a stationary piston member secured to said first housing portion and a movable cylinder member forming a first clamping means, mounted on said first housing portion for movement toward and away from said axis of symmetry and slidably receiving said piston member; second and third clamping means mounted in said second and third housing portions, respectively, for movement toward and away from said axis of symmetry; and motion transmitting means connecting said first, second, and third clamping means for simultaneous symmetrical movement toward and away from said axis of symmetry whereby a workpiece located in said axis of symmetry is simultaneously clamped and released by said first, second, and third clamping means, said motion transmitting means including three racks, one of said racks being secured to said cylinder member and the other two racks being secured to said second and third clamping means, respectively, three pinion means, each pinion means including a shaft, and first and second pinions on said shaft, said first pinions meshing with said racks, respectively, and an annular gear mounted on said supporting means for rotation about an axis coinciding with said axis of symmetry and meshing with said second pinions.

References Cited

UNITED STATES PATENTS

| 2,547,529 | 4/1951 | Lichtenberg | 82—39 XR |
| 2,587,893 | 3/1952 | Pridy et al. | 279—4 |

FOREIGN PATENTS

| 813,620 | 5/1959 | Great Britain. |
| 410,798 | 6/1945 | Italy. |

LEONIDAS VLACHOS, Primary Examiner

U.S. Cl. X.R.

82—2